(12) United States Patent
Ireland et al.

(10) Patent No.: US 9,789,701 B1
(45) Date of Patent: Oct. 17, 2017

(54) SYSTEM AND METHOD FOR PRINTING ON A THREE-DIMENSIONAL (3D) CURVED OBJECT

(71) Applicant: Xerox Corporation, Norwalk, CT (US)

(72) Inventors: Jonathan Ireland, Lancaster, PA (US); Donald Thresh, Fairport, NY (US); Michael N. Soures, Webster, NY (US); James D. VanBortel, Rochester, NY (US); Bruce H. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/269,048

(22) Filed: Sep. 19, 2016

(51) Int. Cl.
  *B41J 3/407* (2006.01)
  *B41J 11/20* (2006.01)
  *B25J 9/16* (2006.01)
  *B41J 25/00* (2006.01)

(52) U.S. Cl.
  CPC .......... *B41J 3/4073* (2013.01); *B25J 9/1682* (2013.01); *B41J 11/20* (2013.01); *B41J 25/001* (2013.01)

(58) Field of Classification Search
  CPC ......... B41J 3/4073; B41J 3/407; B25J 9/1682
  See application file for complete search history.

(56) References Cited

U.S. PATENT DOCUMENTS

| | | | | |
|---|---|---|---|---|
| 5,795,395 | A * | 8/1998 | Ben-Matitayhu | B41J 3/4073 118/13 |
| 7,806,793 | B2 * | 10/2010 | Yoshida | F16G 5/16 474/188 |
| 8,511,782 | B2 | 8/2013 | Chang et al. | |
| 9,217,090 | B2 | 12/2015 | Donohoe et al. | |
| 9,452,616 | B1 * | 9/2016 | Mathis | B41J 3/4073 |
| 2004/0017408 | A1 * | 1/2004 | Cok | B05B 13/04 347/5 |
| 2005/0179721 | A1 | 8/2005 | Jones et al. | |
| 2008/0252711 | A1 * | 10/2008 | Martinez | B41J 3/4073 347/110 |
| 2010/0302304 | A1 * | 12/2010 | Bauer | B41J 3/4073 347/20 |
| 2016/0009104 | A1 * | 1/2016 | Matsuhashi | B41J 3/4073 347/9 |
| 2016/0200524 | A1 * | 7/2016 | Neubauer | B41J 3/4073 198/401 |
| 2016/0347099 | A1 * | 12/2016 | Ernst | B41J 11/04 |

\* cited by examiner

*Primary Examiner* — Shelby Fidler
(74) *Attorney, Agent, or Firm* — Maginot Moore & Beck LLP

(57) ABSTRACT

A printing system includes a first member and a second member. The second member is positioned parallel to the first member. The system further includes a first extensible member and a second extensible member. The system further includes a first gripper and a second gripper. One end of the first extensible member is mounted to the first member and the other end of the first extensible member is mounted to the first gripper. One end of the second extensible member is mounted to the second member and the other end is mounted to the second gripper. A controller operates a first actuator operatively connected to the first and second extensible members.

8 Claims, 3 Drawing Sheets

SYSTEM AND METHOD FOR PRINTING ON A THREE-DIMENSIONAL (3D) CURVED OBJECT

TECHNICAL FIELD

This disclosure relates generally to a system and method for printing on three-dimensional (3D) objects, and more particularly, to systems and methods for printing on a roughly cylindrical 3D object.

BACKGROUND

Current production printing utilizes known techniques, such as two-dimensional (2D) printing technology, to print image content on objects. In order to print customized image content on a portion of 3D object, the printheads have to be maneuvered to present the object portion to be printed as a parallel plane to the printheads. Some previously known systems attempt to move the 3D object to enable printing on the object, but the degrees of freedom for the object are very restricted. Consequently, many objects, particularly curved objects cannot be printed in these previously known systems. Thus, systems that enable the printing of curved 3D object surfaces are desirable.

SUMMARY

A new printing system is configured to provide printing on a 3D object. The printing system includes a first member having a first end and a second end. The printing system further includes a second member having a first end and a second end. The second member is positioned to be parallel to the first member. The printing system further includes a first extensible member having a first end and a second end. The first end of the first extensible member is mounted to the first member. The printing system also includes a second extensible member having a first end and a second end. The first end of the second extensible member is mounted to the second member. The printing system further includes a first gripper mounted to the second end of the first extensible member and a second gripper mounted to the second end of the second extensible member. The printing system also includes a first actuator operatively connected to the first extensible member and the second extensible member. The printing system further includes a printhead positioned and configured to eject material into a space between the first gripper and the second gripper. The printing system further includes a controller operatively connected to the first actuator and the printhead. The controller is configured to operate the first actuator to move the second end of one of the first extensible member and the second extensible member towards the first end of the one of the first extensible member and the second extensible member and move the second end of the other of the first extensible member and the second extensible member away from the first end of the other extensible member to position a portion of an object held by the first gripper and the second gripper at a predetermined distance from the printhead in a plane parallel to the printhead and operate the printhead to eject material onto the portion of an object held by the first gripper and the second gripper.

A method operates the printing system that is configured to provide printing on a 3D object. The method includes operating a first actuator with a controller to move a second end of a first extensible member towards a first end of the first extensible member and to move a second end of a second extensible member away from a first end of the second extensible member to position a portion of an object held by a first gripper mounted to the first end of the first extensible member and a second gripper mounted to the first end of the second extensible member at a predetermined distance from a printhead in a plane parallel to the printhead. The method further includes operating the printhead with the controller to eject material onto the portion of an object held by the first gripper and the second gripper.

BRIEF DESCRIPTION OF THE DRAWINGS

The foregoing aspects and other features of a printing system that allows for printing on 3D objects are explained in the following description, taken in connection with the accompanying drawings.

DETAILED DESCRIPTION

Figure 1:
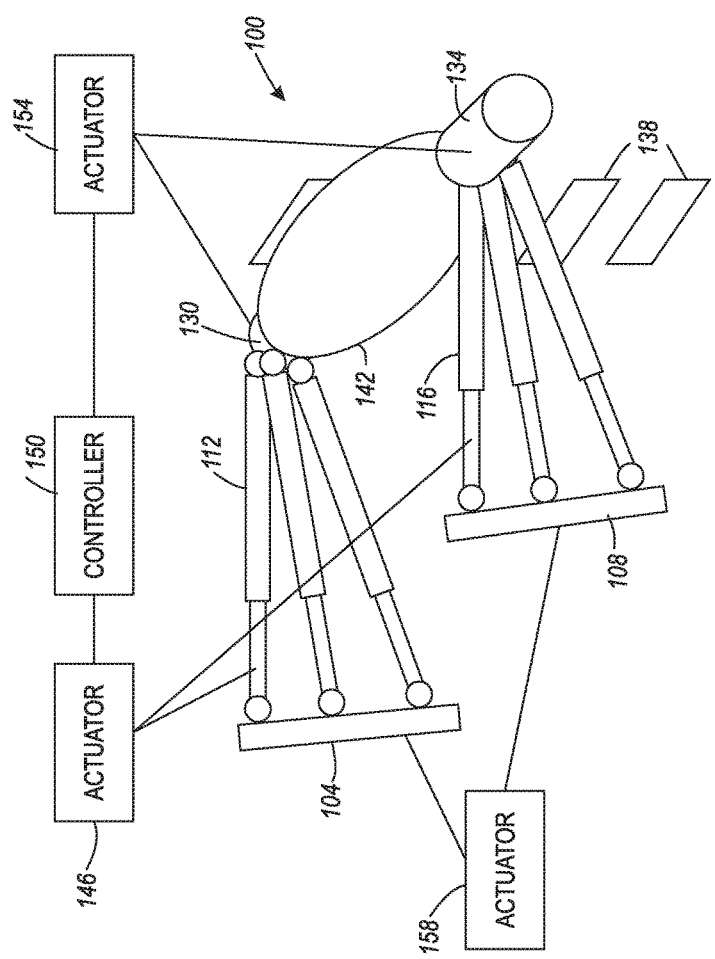
FIG. 1 illustrates an exemplary printing system 100 configured to print on a 3D object.

For a general understanding of the present embodiments, reference is made to the drawings. In the drawings, like reference numerals have been used throughout to designate like elements.

FIG. 1 illustrates an exemplary printing system 100 configured to print on a 3D object. The printing system 100 includes a first member 104 and a second member 108. In one example, the second member 108 is positioned parallel to the first member 104. The printing system 100 further includes a first extensible member 112 and a second extensible member 116. One end of the first extensible member 112 is mounted to the first member 104 and one end of the second extensible member 116 is mounted to the second member 108. The other end of the first extensible member 112 is mounted to a first gripper 130 and the other end of the second extensible member 116 is mounted to a second gripper 134. In one example, multiple first extensible members 112 are mounted from different locations on the first member 104 to the first gripper 130. Similarly, multiple second extensible members 116 are mounted from different locations on the second member 108 to the second gripper 134. For example, as illustrated in FIG. 1, three first extensible members 112 are mounted from first member 104 to the first gripper 130 and three second extensible members 116 are mounted from the second member 108 to the second gripper 134 like a hexapod-like positioner. In this example, the known positions of the three mount point after a controlled motion allow for a known position of the object 142. The first gripper 130 and the second gripper 134 are configured to hold one end of an object 142 and present a portion of the object to a particular printhead 138. In one example, the object 142 can be a roughly cylindrical object 142. As shown in the figure, the object 142 has curved walls so the object resembles an American football. The system 100 also includes an array of printheads 138, for example color printheads 138, in a fixed printhead architecture. Each printhead 138 is configured to eject material into a space between a first gripper 130 and a second gripper 134 to print on a portion of the object 142 held between the first gripper 130 and the second gripper 134.

Figure 2:
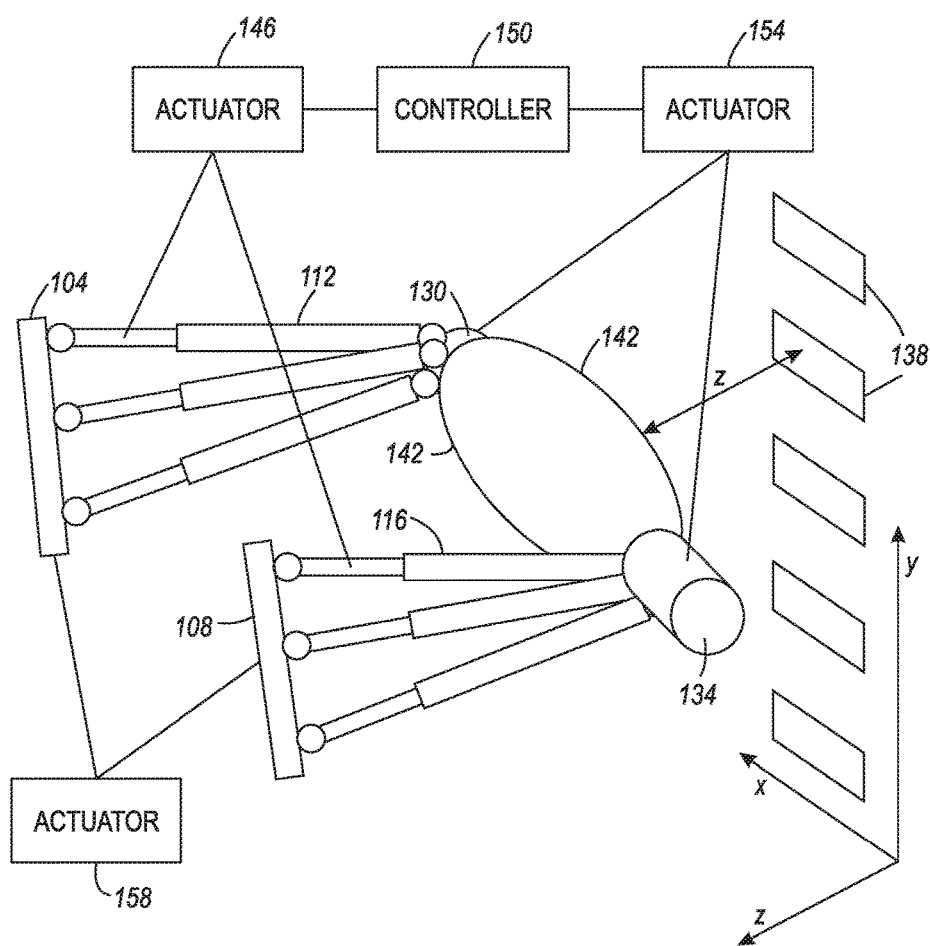
FIG. 2 illustrates another embodiment 200 of the exemplary printing system 100 configured to print on a 3D object.

FIG. 2 illustrates another embodiment 200 of the exemplary printing system 100. In this embodiment, the X-axis is considered to be the along the length of the print heads 138. The Y-axis is considered to be along the length of the printheads 138, i.e., from the lowest printhead 138 to the highest printhead 138. The reader should understand that the printheads 138 can be configured and placed in another manner. The Z-axis is considered to be along the distance of the object 142 from the printheads 138. The first base member 104 and the second base member 108 provide vertical translation in the Y-axis of the assembly past parallel and stationary print heads 138. In one example, the first base member 104 and the second base member 108 can be directly connected and the actuator 158 can move the first base member 104 and the second base member 108 in one motion in order to move the object 142 along the Y-axis.

As further illustrated in FIG. 2, the first extensible member 112 and the second extensible member 116 allow the object 142 to be moved in several axes. In one example, the first extensible member 112 and the second extensible member 116 can position one or both ends of the object 142 closer or further from the printheads 138. In this example, the actuator 146 can move the first extensible member 112 and the second extensible member 116 together in the Z-axis. If the first extensible member 112 and the second extensible member 116 are moved independently, the system 200 can pivot or rotate the axis of the object 142 around the Y-axis to position the narrow end of the object 142 or the part of the object 142 closer to the printhead 138.

As further illustrated in FIG. 2, the first extensible member 112 and the second extensible member 116 can also position one or both ends of the object 142 higher or lower vertically relative to the vertically translated position of base first member 104 and second member 108 and also relative to the printheads 138, which may be stationary. In this example, the first extensible member 112 and the second extensible member 116 move the object 142 in the Y-axis that allows the system 200 to rotate the axis of the object 142 around the Z-axis.

As further illustrated in FIG. 2, the first extensible member 112 and the second extensible member 116 can also position one or both ends of the object 142 side to side relative to the position of the printheads 138. Positioning one or both ends of the object 142 side to side allows the system 200 to present the object 142 to the printhead 138 and provide a wider swath of printing from a narrow head. In this example, the first and second extensible members 112, 116 can move the object 142 in the X-axis.

In another example, the motions of the first extensible member 112, second extensible member 116, the first gripper 130, and the second gripper 134 can be coordinated to accommodate objects that are not uniform in revolution. These motions enable the system 200 to spin, for example, but not limited to, an object 142, present an object 142 that has exterior protuberances, present an object 142 that has a cam-shape, or move the object 142 away from the printhead 138 when an exterior protuberance on the object 142 comes in front of the printhead 138.

In one embodiment, a first actuator 146 is operatively connected to the first extensible member 112 and the second extensible member 116. The first actuator 146 can be configured to extend or contract the arms of the first extensible member 112 or the second extensible member 116 or both to tilt a portion of the object 142 towards and away from a printhead 138 to present the portion at a predetermined distance from the printhead 138. The printing system 100 can position the object 142 in a plane parallel to the printhead 138. For example, the actuator is operated to extend the arm of the first extensible member 112 and move the end of the first extensible member 112 mounted on the first gripper 130 away from the end mounted on the first member 104. In another example, the actuator is operated to contract the arm of the first extensible member 112 and move the end of the first extensible member 112 mounted on the first gripper 130 towards the end mounted on the first member 104. A controller 150 is operatively connected to the first actuator 146 to operate the actuator 146 to extend and contract the arms of the first extensible member 112 and the arms of the second extensible member 116. Typically, the actuator 146 is operated to contract the arm of one extensible member and extend the arm of the other extensible member to tilt the curved wall of the object and present a portion of the object as a roughly parallel plane to a printhead. This tilting enables a portion of the object 142 to be presented to the printhead at gap conducive for printing. The controller 150 is operatively connected to the printheads 138 to operate the printhead 138 opposite a portion of the object 142 to eject material onto the portion of the object 142.

Additionally or alternatively, the printing system 100 further includes a second actuator 154 that is operatively connected to the first gripper 130 and the second gripper 134. The second actuator 154 can be configured to rotate either the first gripper 130 or the second gripper 134 or both in order to rotate the object 142 about a longitudinal axis between the first gripper 130 and second gripper 134. This configuration allows the system 100 to spin the object 142 mounted in between the first gripper 130 and the second gripper 134 so a ring or partial ring of printing can be performed on the portion of the object 142 opposite a printhead 138. The controller 150 is operatively connected to the printhead 138 and the actuator 154 to operate the printhead 138 and eject material onto a portion of the object 142 as the object 142 rotates opposite the printhead 138.

Additionally or alternatively, the system 100 includes a third actuator 158 that is connected to the first member 104 and the second member 108. The controller 150 is configured to operate the third actuator 158 to move the ends of the extensible members 112 and 116 mounted to the first member 104 and the second member 108 in a plane that is parallel to the printhead 138 to position the object 142 opposite different printheads in the array of printheads. In one example, the first member 104 and second member 108 have vertical tracks in which the ends of the first extensible member 112 and the second extensible member 116 are mounted for movement past the printheads 138.

The controller 150 in the system 100 described above is capable of operating the first actuator 146, the second actuator 154, and the third actuator 158, or any combination thereof to maneuver any portion of the object 142 opposite any printhead 138 to enable printing of an image on the portion. For example, the system 100 can translate, spin, and tilt the object 142 to a position any portion of the surface opposite at least one printhead 138 for printing at the appropriate print gap. This operation allows for full color printing on objects such as a roughly cylindrical object in a fixed printhead 138 array architecture. The system 100 can be used to leverage 2D printing techniques in existing systems to extend application of production printing customization on 3D objects, for example roughly cylindrical 3D objects 142.

Figure 3:
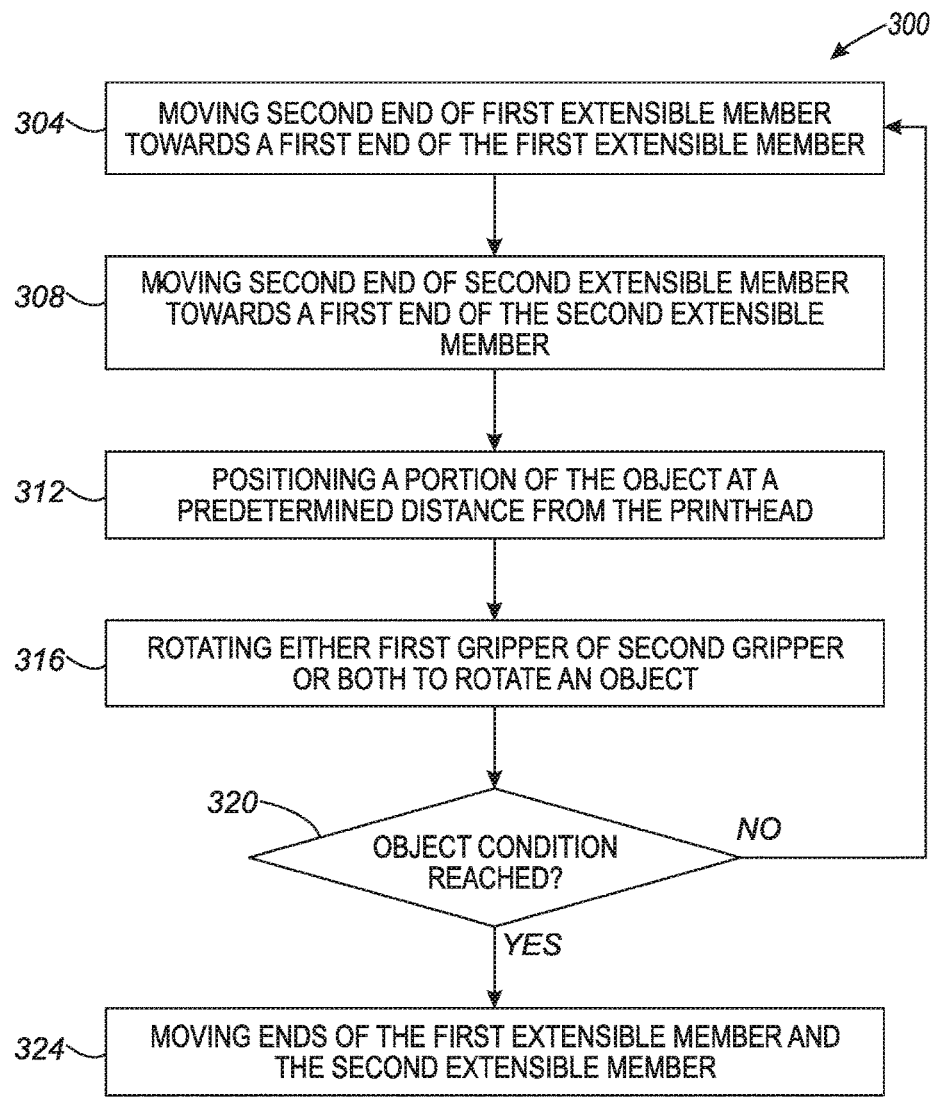
FIG. 3 illustrates a flow diagram of an exemplary method for printing on a 3D object.

FIG. 3 illustrates a flow diagram of an exemplary method for printing on a 3D object. The method 300 begins with moving one end of the first extensible member 112 towards the other end of the first extensible member 112 (block 304) while also moving one end of the second extensible member 116 away from the other end of the extensible member 116

(block 308) to tilt the object and present a particular portion of the wall of the object opposite a printhead at an appropriate gap for printing (block 312). For example, controller 150 can operate the first actuator 146 to move the end of the first extensible member 112 connected to the first gripper 130 towards the other end of the first extensible member 112 connected to the first member 104 and also move the end of the second extensible member 116 connected to the second gripper 134 away from the other end of the second extensible member 116 connected to the second member 108. The method 300 further includes, using the controller 150, to operate the printhead 138 to eject material onto the object 142 once a portion of the object has been positioned appropriately opposite a printhead. The process also includes operating the second actuator 154 with the controller 150 to rotate either the first gripper 130 or the second gripper 134 or both to rotate the object 142 (block 316). This rotation enables a printhead to print a ring or partial ring about the object. The manipulation of the extensible arms continues until a condition has been reached (block 320). In one example, the condition is when rings or partial rings have been printed on the object from one end to the other end of the object held by the grippers. Once a ring or partial ring is printed on the object, the method 300 continues by operating the third actuator 158 with the controller 150 to move the ends of the first extensible member 112 and the second extensible member 116 in a plane that is parallel to the printhead 138 (block 324). This operation enables the object to be moved opposite another set of one or more printheads to enable printheads that eject a different material to print the surface of the object. For example, the next set of one or more printheads can eject a different color of material onto the object. Once the next set of printheads has been reached, the processing of blocks 304 to 324 is repeated to enable the object to be printed with the different material.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printing system comprising:
   a first member having a first end and a second end;
   a second member having a first end and a second end, the second member being positioned to be parallel to the first member;
   a first extensible member having a first end and a second end, the first end of the first extensible member being mounted to the first member;
   a second extensible member having a first end and a second end, the first end of the second extensible member being mounted to the second member;
   a first gripper mounted to the second end of the first extensible member;
   a second gripper mounted to the second end of the second extensible member;
   a first actuator operatively connected to the first extensible member and the second extensible member;
   a printhead positioned and configured to eject material into a space between the first gripper and the second gripper; and
   a controller operatively connected to the first actuator and the printhead, the controller being configured to:
   operate the first actuator to move the second end of one of the first extensible member and the second extensible member towards the first end of the one of the first extensible member and the second extensible member and move the second end of the other of the first extensible member and the second extensible member away from the first end of the other extensible member to position a portion of an object held by the first gripper and the second gripper at a predetermined distance from the printhead in a plane parallel to the printhead; and
   operate the printhead to eject material onto the portion of an object held by the first gripper and the second gripper.

2. The printing system of claim 1 further comprising:
   a second actuator operatively connected to one of the first gripper and the second gripper, the gripper operatively connected to the second actuator being configured to rotate about a longitudinal axis between the first gripper and the second gripper;
   the second gripper being configured to rotate about the longitudinal axis between the first gripper and the second gripper; and
   the controller being operatively connected to the second actuator, the controller being configured to operate the second actuator to rotate the gripper operatively connected to the second actuator to rotate the object held by the first gripper and the second gripper and to operate the printhead to eject material onto the object as the object rotates.

3. The printing system of claim 1 further comprising:
   a third actuator operatively connected to the first member and the second member; and
   the controller being further configured to operate the third actuator operatively connected to the first member and the second member to move the first and the second members in a plane that is parallel to the printhead and to operate the actuator operatively connected to the first extensible member and the second extensible member to position another portion of the object held by the first gripper and the second gripper to the predetermined distance from the printhead in the plane parallel to the printhead.

4. The printing system of claim 1 further comprising:
   at least one other printhead, the at least one other printhead being positioned at a distance from the printhead;
   the third actuator operatively connected to the first member and the second member; and
   the controller being further configured to operate the third actuator operatively connected to the first member and the second member to move the first and the second members in a plane that is parallel to the printhead and the at least one other printhead, and to operate the third actuator operatively connected to the first member and the second member to move the object held by the first gripper and the second gripper along a line perpendicular to the longitudinal axis of the object to position the portion of the object held by the first gripper and the second gripper to the predetermined distance from the at least one other printhead in the plane parallel to the printhead.

5. An assembly for enabling printing of an oblong object comprising:
   a first member having a first end and a second end;
   a second member having a first end and a second end, the second member being positioned to be parallel to the first member;

a plurality of first extensible members having a first end and a second end, the first end of each of the first extensible members being mounted to the first member;

a plurality of second extensible members having a first end and a second end, the first end of each of the second extensible members being mounted to the second member;

a first gripper mounted to the second end of each of the first extensible members;

a second gripper mounted to the second end of each of the second extensible members;

a first actuator operatively connected to each of the first extensible members and the each of second extensible members; and a controller operatively connected to the first actuator, the controller being configured to:

operate the first actuator to move the second end of one of the first extensible member and the second extensible member towards the first end of the one of the first extensible member and the second extensible member and move the second end of the other of the first extensible member and the second extensible member away from the first end of the other extensible member to position a portion of an object held by the first gripper and the second gripper at a predetermined distance from a printhead in a plane parallel to the printhead.

6. The assembly of claim 5 further comprising:

a second actuator operatively connected to one of the first gripper and the second gripper, the gripper operatively connected to the second actuator being configured to rotate about a longitudinal axis between the first gripper and the second gripper;

the second gripper being configured to rotate about the longitudinal axis between the first gripper and the second gripper; and the controller being operatively connected to the second actuator, the controller being configured to operate the second actuator to rotate the gripper operatively connected to the second actuator to rotate the object held by the first gripper and the second gripper to enable the printhead to eject material onto the object as the object rotates.

7. The assembly of claim 5 further comprising:

a third actuator operatively connected to the first member and the second member; and the controller being further configured to operate the third actuator operatively connected to the first member and the second member to move the first and the second members in a plane that is parallel to the printhead and to operate the third actuator operatively connected to the first extensible member and the second extensible member to position another portion of the object held by the first gripper and the second gripper to the predetermined distance from the printhead in the plane parallel to the printhead.

8. The assembly of claim 5 further comprising:

a third actuator operatively connected to the first member and the second member; and the controller being further configured to operate the third actuator operatively connected to the first member and the second member to move the first and the second members in a plane that is parallel to the printhead and the at least one other printhead, and to operate the third actuator operatively connected to the first member and the second member to move the object held by the first gripper and the second gripper along a line perpendicular to the longitudinal axis of the object to position the portion of the object held by the first gripper and the second gripper to the predetermined distance from another printhead in the plane parallel to the printhead.

* * * * *